US012641550B2

(12) United States Patent
    Cudak et al.

(10) Patent No.: US 12,641,550 B2
(45) Date of Patent: May 26, 2026

(54) DYNAMIC POWER SCALING IN A SERVER SYSTEM USING A POWER RAMP CAP

(71) Applicant: LENOVO ENTERPRISE SOLUTIONS (SINGAPORE) PTE. LTD., Singapore (SG)

(72) Inventors: Gary D. Cudak, Morrisville, NC (US); Vinod Kamath, Raleigh, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 845 days.

(21) Appl. No.: 17/957,376

(22) Filed: Sep. 30, 2022

(65) Prior Publication Data

US 2024/0114466 A1     Apr. 4, 2024

(51) Int. Cl.
    *H04W 52/36*      (2009.01)
    *H04W 52/32*      (2009.01)
(52) U.S. Cl.
    CPC ....... *H04W 52/367* (2013.01); *H04W 52/325* (2013.01)

(58) Field of Classification Search
    CPC .......................... H04W 52/367; H04W 52/325
    See application file for complete search history.

(56) References Cited

U.S. PATENT DOCUMENTS

| | | | |
|---|---|---|---|
| 9,250,684 B1* | 2/2016 | Chen ..................... | G06F 1/3206 |
| 11,449,125 B1* | 9/2022 | Verrilli .................. | G06F 1/3228 |
| 2011/0144818 A1* | 6/2011 | Li .............................. | G06F 1/26 |
| | | | 700/291 |
| 2012/0036385 A1* | 2/2012 | Faasse .................. | G06F 1/3206 |
| | | | 713/340 |
| 2012/0226922 A1* | 9/2012 | Wang .................... | G06F 1/3203 |
| | | | 713/320 |
| 2013/0268779 A1* | 10/2013 | Hueston ............... | G06F 1/3206 |
| | | | 713/300 |
| 2017/0255243 A1* | 9/2017 | Gambon ............... | G06F 1/3206 |
| 2018/0267597 A1* | 9/2018 | Allen-Ware ........... | G06F 1/266 |
| 2020/0026338 A1* | 1/2020 | Maddukuri .............. | G06F 1/28 |
| 2021/0373639 A1* | 12/2021 | Kontorinis ............... | G06F 1/28 |

* cited by examiner

*Primary Examiner* — Raymond N Phan

(57)              ABSTRACT

Dynamic power scaling in a server system including providing, by a controller in the server system, a maximum power cap and setting, by the controller in the server system, a power ramp cap where the power ramp cap provides power scaling up and down, thereby efficiently managing power and workloads.

20 Claims, 5 Drawing Sheets

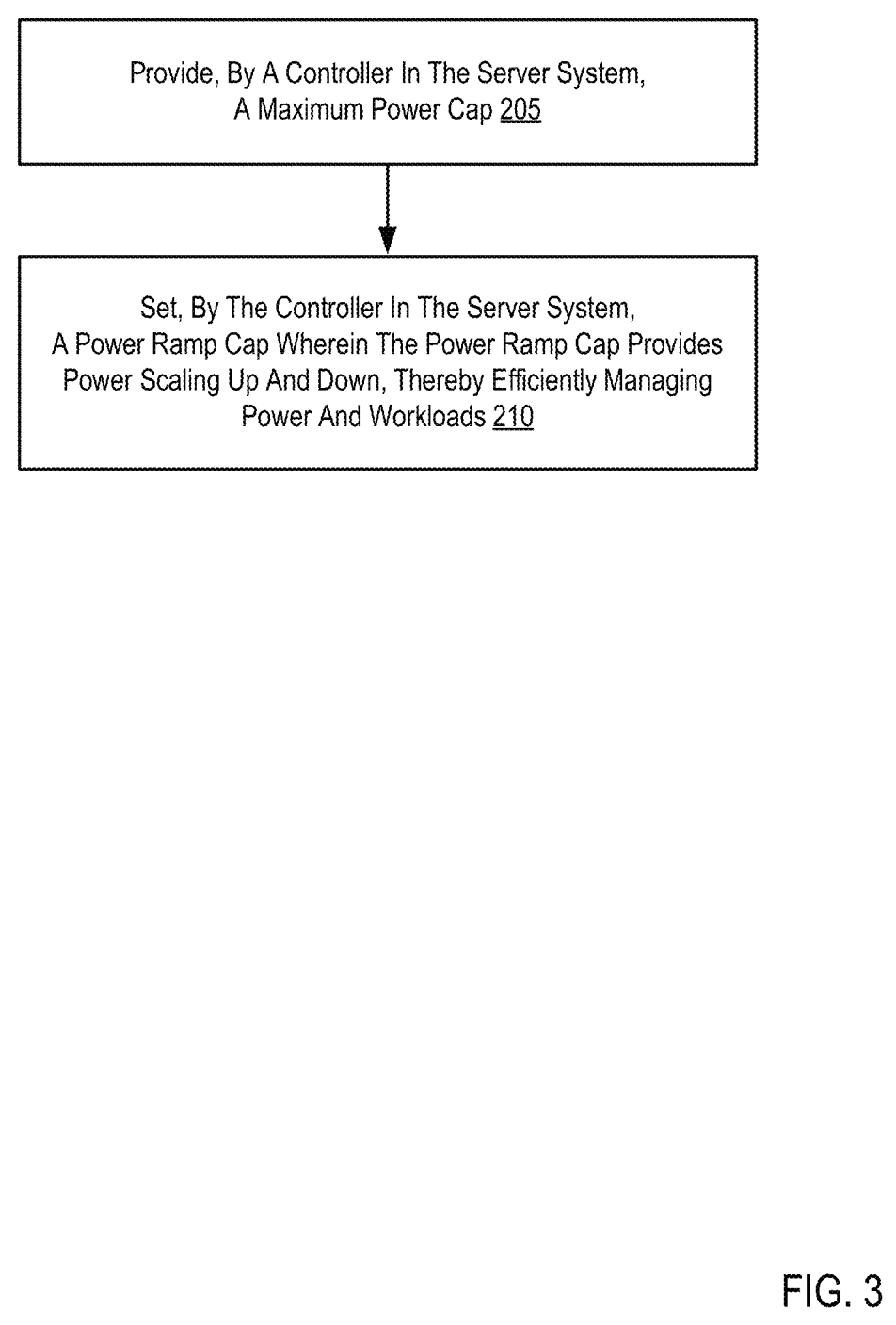

Provide, By A Controller In The Server System,
A Maximum Power Cap <u>205</u>

Set, By The Controller In The Server System,
A Power Ramp Cap Wherein The Power Ramp Cap Provides
Power Scaling Up And Down, Thereby Efficiently Managing
Power And Workloads <u>210</u>

FIG. 3

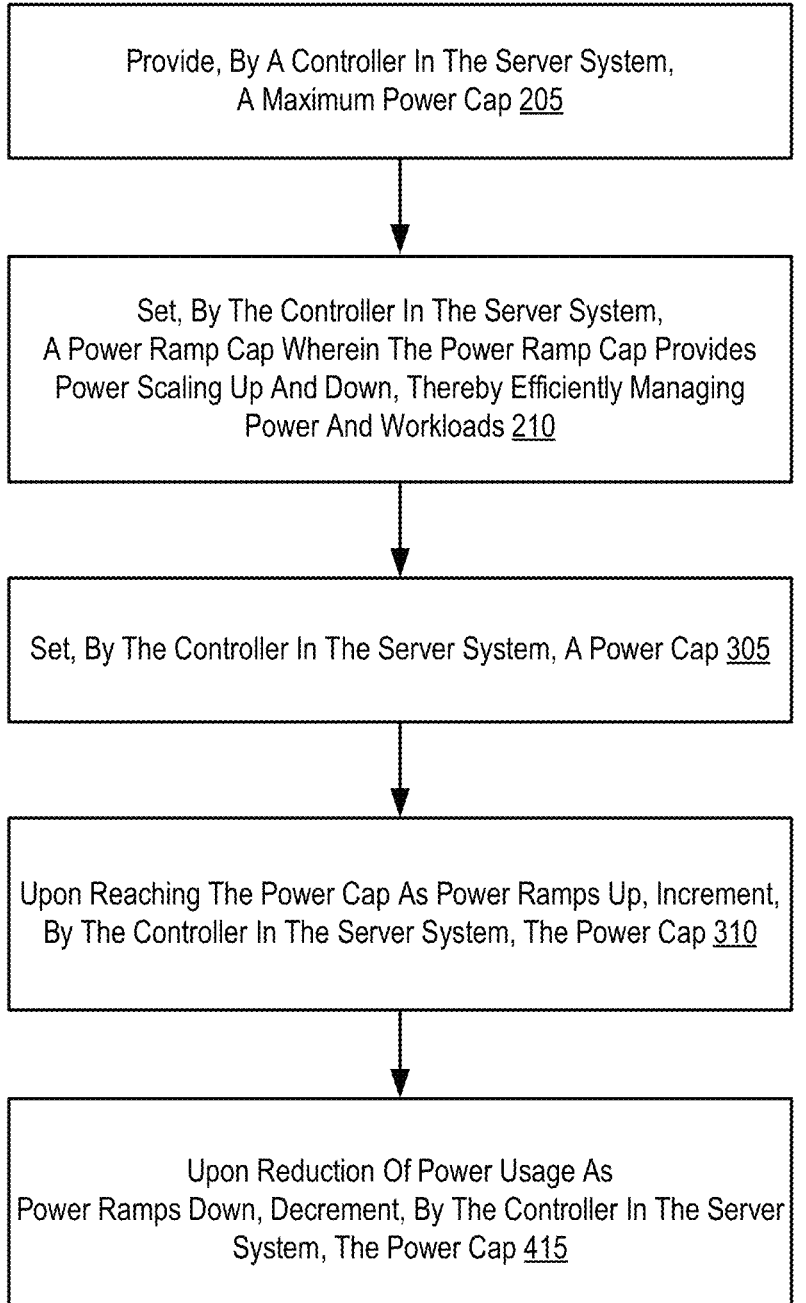

Provide, By A Controller In The Server System,
A Maximum Power Cap 205

Set, By The Controller In The Server System,
A Power Ramp Cap Wherein The Power Ramp Cap Provides
Power Scaling Up And Down, Thereby Efficiently Managing
Power And Workloads 210

Set, By The Controller In The Server System, A Power Cap 305

Upon Reaching The Power Cap As Power Ramps Up, Increment,
By The Controller In The Server System, The Power Cap 310

Upon Reduction Of Power Usage As
Power Ramps Down, Decrement, By The Controller In The Server
System, The Power Cap 415

FIG. 4

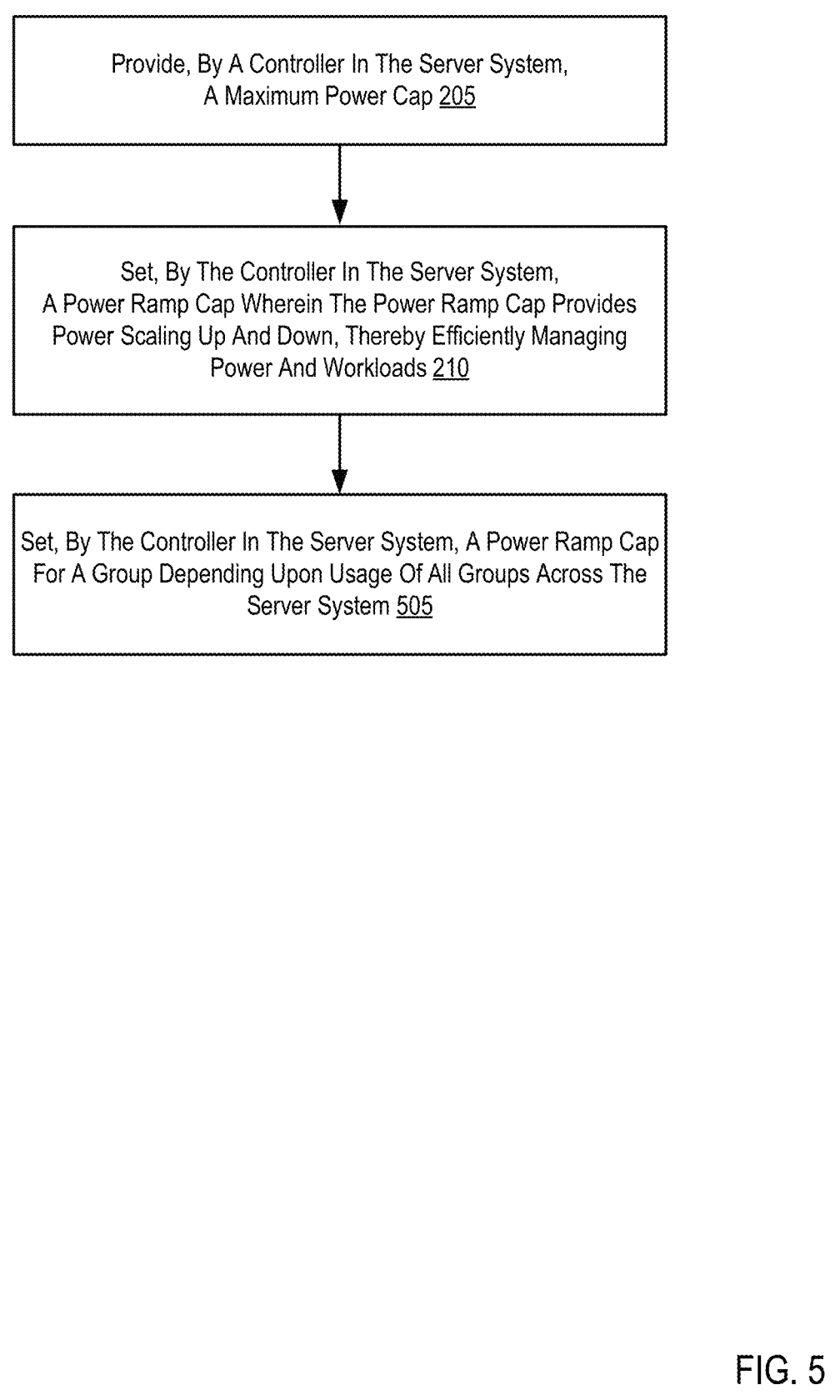

Provide, By A Controller In The Server System,
A Maximum Power Cap <u>205</u>

Set, By The Controller In The Server System,
A Power Ramp Cap Wherein The Power Ramp Cap Provides
Power Scaling Up And Down, Thereby Efficiently Managing
Power And Workloads <u>210</u>

Set, By The Controller In The Server System, A Power Ramp Cap
For A Group Depending Upon Usage Of All Groups Across The
Server System <u>505</u>

FIG. 5

DYNAMIC POWER SCALING IN A SERVER SYSTEM USING A POWER RAMP CAP

BACKGROUND

In current computing environments, servers or nodes can number in the hundreds or thousands. The servers are mounted in racks in a chassis with multiple racks in a data center. Servers use large amounts of power and generate heat that necessitates significant cooling. A data center has a maximum power capacity, as a function of infrastructure, as well as a maximum cooling capacity. The data center also has a maximum rate of increase, i.e., handles slower increases in power usage better than faster increases in power usage. The data center supplies power for the server systems in groups for different customers. As customers add new workloads, their power needs can spike very quickly, beyond the ability of the data center to handle. In order to ensure that they have sufficient power, customers create fake workloads to keep their power usage more constant without high peaks and low valleys. However, that wastes power and incurs high administrative costs for the data center. A dynamic power scaling system is desired.

SUMMARY

Methods, systems, and apparatus for dynamic power scaling in a server system are disclosed in this specification. Dynamic power scaling in a server system includes providing, by a controller in the server system, a maximum power cap; and setting, by the controller in the server system, a power ramp cap wherein the power ramp cap provides power scaling up and down, thereby efficiently managing power and workloads.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

BRIEF DESCRIPTION OF THE DRAWINGS

FIG. 3 sets forth a flow chart illustrating an exemplary method for dynamic power scaling in a server system according to embodiments of the present disclosure.

FIG. 4 sets forth a flow chart illustrating an exemplary method for dynamic power scaling in a server system according to embodiments of the present disclosure.

FIG. 5 sets forth a flow chart illustrating an exemplary method for dynamic power scaling in a server system according to embodiments of the present disclosure.

DETAILED DESCRIPTION

Figure 1:
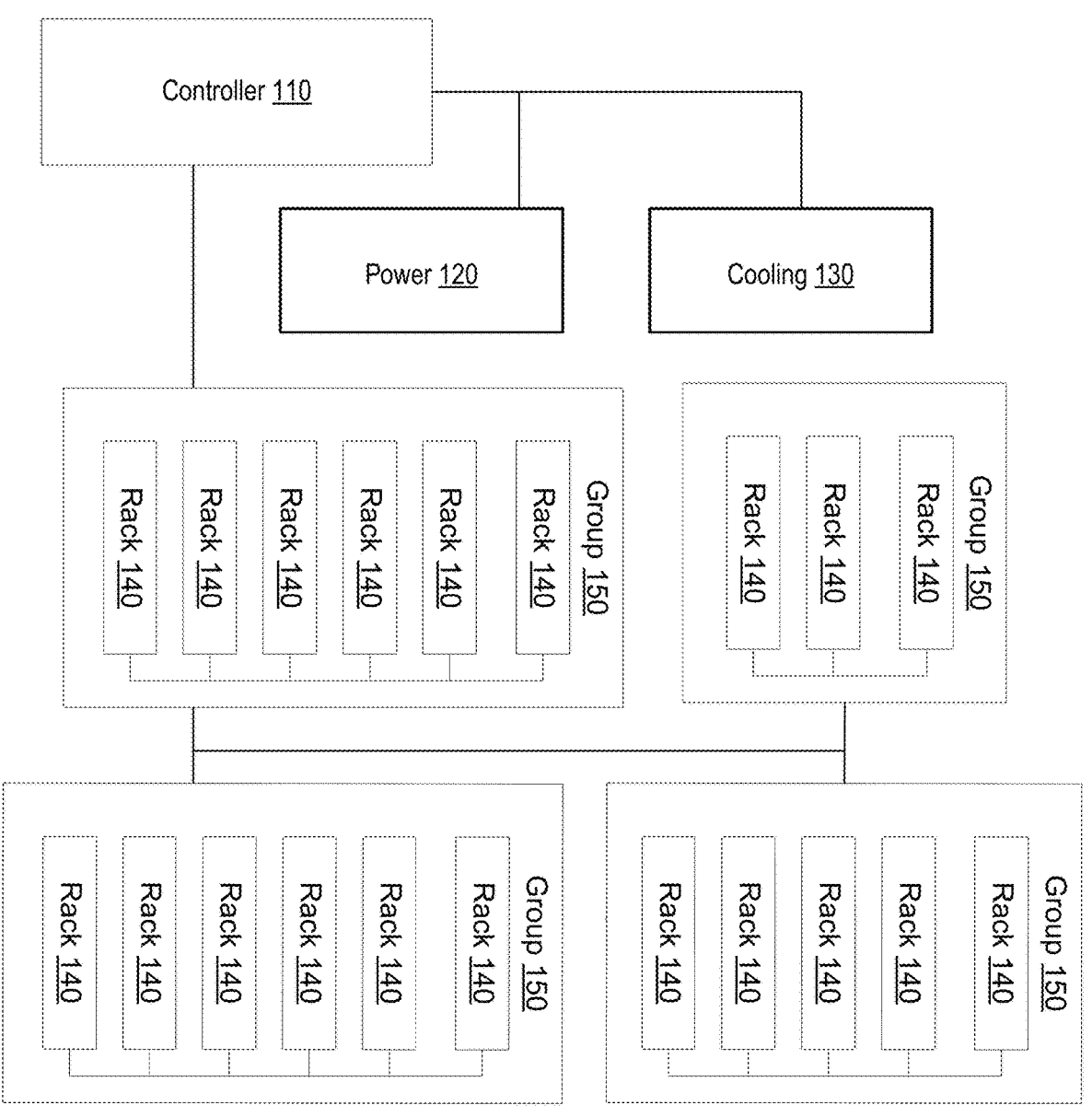
FIG. 1 sets forth a block diagram of an example system configured for dynamic power scaling in a server system according to embodiments of the present disclosure.

Exemplary methods, apparatus, and products for dynamic power scaling in a server system in accordance with the present disclosure are described with reference to the accompanying drawings, beginning with FIG. 1. FIG. 1 sets forth a diagram of a controller 110 configured for dynamic power scaling in a server system according to embodiments of the present disclosure. The controller 110 of FIG. 1 communicates with power 120 and with cooling 130. The controller 110 also communicates with server racks 140 that are organized into groups 150.

The controller 110 includes hardware and software that communicates with and controls racks 140. The controller 110 controls each chassis or rack management controller performing configuration and monitoring tasks, controlling power and components, and enabling alerts. The controller 110 communicates with a user such as an administrator with local or remote input and output devices or by a web-based or cloud-based interface or other user interface system. The controller 110 may also communicate with a customer with the local or remote input and output devices or by a web-based or cloud-based interface or other user interface system.

The controller 110 communicates with power 120 that controls power for the server system. Power 120 has a maximum power capacity and also has a maximum rate of increase, i.e., handles slower increases in power usage better than faster increases in power usage, as a function of infrastructure.

The controller 110 communicates with cooling 130 that controls cooling for the server system. Cooling 130 has a maximum cooling capacity and also uses power from power 120. Cooling 130 includes individual air or liquid cooling for each rack 140 and for the entire data center. Cooling 130 has a maximum cooling capacity that is a function of power from power 120, heat generated from the racks 140, and time.

The server racks 140 are racks that house multiple servers or nodes stacked vertically or horizontally. Each rack 140 may house tens or hundreds or thousands of servers or nodes or more, and each server may have a baseboard management controller in communication with a chassis or rack management controller (not shown). The servers may include processors, memory, integrated network controllers, and storage drives in various configurations (not shown) and may be fully independent servers or may be blade servers that use chassis resources for networking, storage, etc. The racks 140 are powered by power 120 and cooled by cooling 130. Each rack may use up to 15 to 20 kW or more during peak demands and less during idle or periods of light workloads.

The controller 110 communicates with each chassis or rack management controller that controls power, cooling, and other components in the chassis. More specifically, the controller 110 monitors components and powers up and powers down components, power, and cooling as needed.

The racks 140 are organized into groups 150. The groups are logical groups and may correspond to physical location or may be located separately. The groups may be fixed or may be fluid, adding additional servers or racks on an as needed basis. The groups may be grouped for each customer or may be grouped in other logical groupings.

Figure 2:
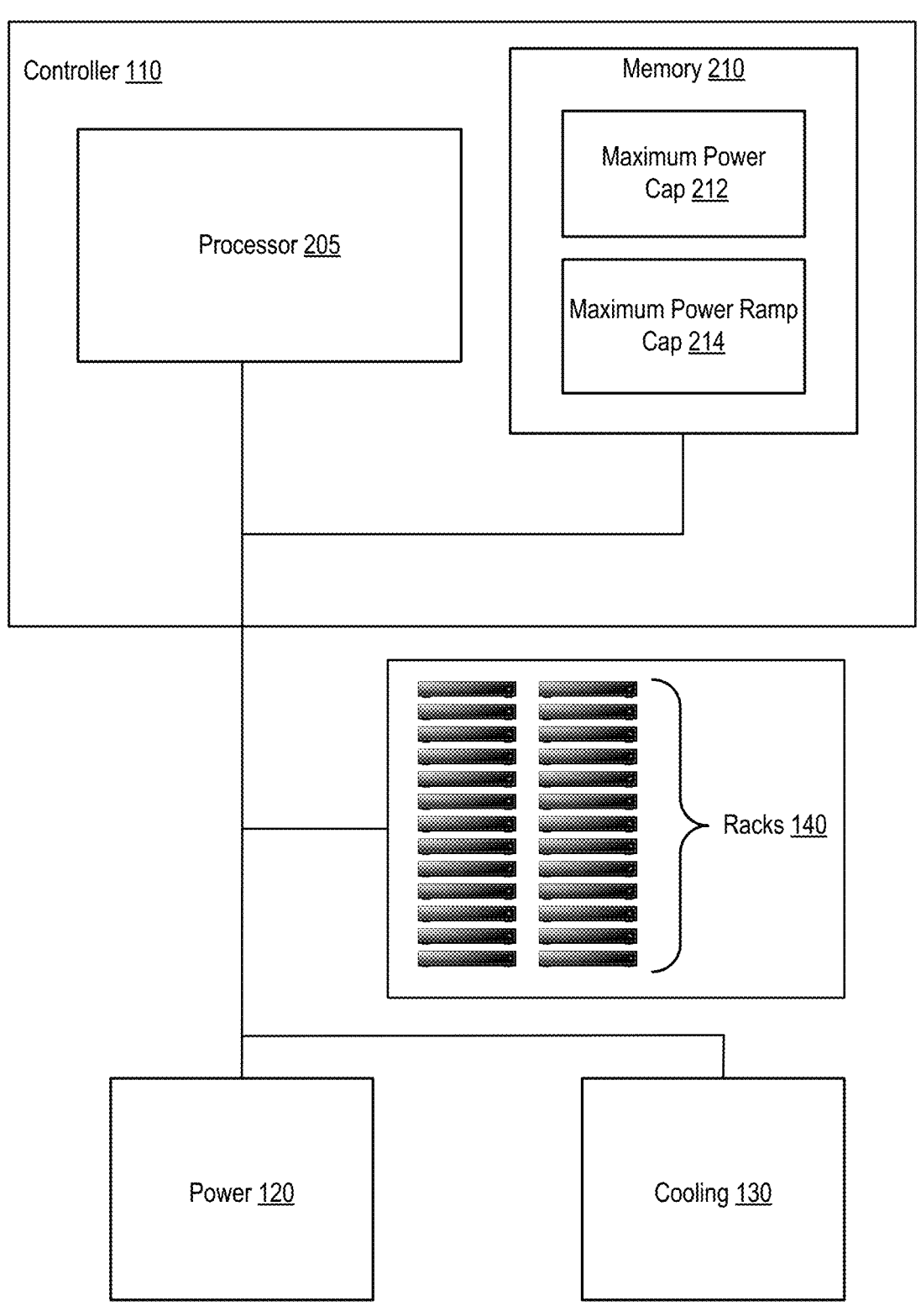
FIG. 2 sets forth a block diagram of an example system configured for dynamic power scaling in a server system according to embodiments of the present disclosure.

For further explanation, FIG. 2 sets forth a block diagram of automated computing machinery including an exemplary controller 110 configured for dynamic power scaling in a server system according to embodiments of the present disclosure. The controller 110 of FIG. 2 is in communication with racks 140 and with power 120 and cooling 130.

In FIG. 2, controller 110 is a controller in communication with the chassis or rack management controllers of racks 140. The controller includes a processor 205 and memory 210 that includes a maximum power cap 212 and a maximum power ramp cap 214. The maximum power cap 212 is a threshold that is set by the administrator for the data center or for each group 150 or for each rack 140 that may be equal to or less than the maximum power capacity for the data center. The maximum power ramp cap 214 is a ramp threshold that is set by the administrator for the data center or for each group 150 or for each rack 140 that may be equal to or less than the maximum power ramp capacity for the data center, which is a function of time. Alternatively, the maximum power ramp cap 214 is a ramp threshold that maybe set by the customer for each group 150 or for each rack 140. The maximum power cap 212 and the maximum power ramp cap 214 are related to the infrastructure of the data center, the power system 120 and the cooling system 130.

The maximum power cap 212 may be set by the administrator for the entire data center, e.g., 50 MW for the entire data center, or may be set for each group 150 or for each rack 140 by dividing the maximum power capacity among them. The customer can also set a maximum power cap 212 for the group 150 or for each 140. This is a threshold that is constant and fixed. The maximum power cap 212 may be updated from time to time but is not changed frequently.

The maximum power cap 212 can be a function of power usage or cooling capacity. The data center may have a maximum power capacity or may have a maximum cooling capacity, e.g., cooling capacity of 5000 racks in a data center with 15000 racks or a maximum temperature that can be cooled, and the maximum power cap 212 can be based upon power capacity or upon cooling capacity.

The maximum power ramp cap 214 may be set by the administrator for the entire data center, e.g., as a 15 MW maximum rise over 12 minutes for the entire data center. The maximum power ramp cap 214 may be set by the administrator for each group 150 or for each rack 140, and each group 150 and each rack 140 may have the same maximum power ramp cap 214 or a different maximum power ramp cap 214. Alternatively, the maximum power ramp cap 214 may be set by the customer for the group 150 or for each individual rack 140, e.g., as a maximum rise of 100 W per 10 minutes or as an initial power cap of 200 W with a scaling of 10% or 50 W per minute or other period of time. Each minute, then, as power requirements increase, the power cap could be incremented 50 W. As the power requirements decrease, the power cap would then be decremented by 50 W as well.

The maximum power ramp cap 214 can be a function of power usage or cooling capacity. The data center may have a maximum power ramp capacity, i.e., cannot handle instantaneous spikes, or may have a maximum cooling ramp capacity, i.e., can handle gradual temperature increases better than steep temperature increases, and the maximum power ramp cap 214 can be based upon power ramp capacity or upon cooling ramp capacity.

The maximum power ramp cap 214 can be fixed or can be revised periodically by the administrator or by the customer. Alternatively, based upon power usage over time, the maximum power ramp cap 214 can be adjusted automatically or manually.

For further explanation, FIG. 3 sets forth a flow chart illustrating an exemplary method for dynamic power scaling in a server system according to embodiments of the present disclosure that includes providing (305), by a controller in the server system, a maximum power cap. Providing (305), by a controller in the server system, a maximum power cap includes an administrator or customer using controller 110 to provide a maximum power cap 212 for a rack 140 or a group 150 or for the entire data center. The maximum power cap can be equal to or less than a maximum power capacity for the data center or for each group 150 or for each rack 140.

FIG. 3 also includes setting (310), by the controller in the server system, a power ramp cap wherein the power ramp cap provides power scaling up and down, thereby efficiently managing power and workloads. Setting (310), by the controller in the server system, a power ramp cap wherein the power ramp cap provides power scaling up and down includes the administrator or customer setting a maximum power ramp cap 213 for each rack 140 or for the group 150 or for the entire data center at the controller 110. The maximum power ramp cap can be set as a function of power increase per period of time, e.g., as a 15 MW maximum rise over 12 minutes for the entire data center or as a maximum rise of 100 W per 10 minutes for each rack 140. The maximum power ramp cap may be set as a function power increase per period of time for cooling increase capacity.

By setting a power ramp cap, the administrator and the customer have knowledge of power usage and can plan workloads more efficiently. There is no need for placeholder workloads to waste power and reduce power spikes. Instead, racks can be at idle or have light or heavy workloads and the power and cooling requirements are already managed and do not require additional planning.

For further explanation, FIG. 4 sets forth a flow chart illustrating an exemplary method for dynamic power scaling in a server system according to embodiments of the present disclosure. The method of FIG. 4 includes providing (305), by a controller in the server system, a maximum power cap; and setting (310), by the controller in the server system, a power ramp cap wherein the power ramp cap provides power scaling up and down, thereby efficiently managing power and workloads.

The method of FIG. 4 differs from the method of FIG. 3, in that FIG. 4 includes setting (405), by the controller in the server system, a power cap. Setting (405), by the controller in the server system, a power cap includes the administrator or the customer setting a power cap for the rack 140 or for the group 150 at the controller 110. The power cap can be an initial power cap that allows for the power used in idle or moderate workloads, e.g., an initial power cap of 200 W.

The method of FIG. 4 further differs from the method of FIG. 3, in that FIG. 4 includes upon reaching the power cap as power ramps up, incrementing (410), by the controller in the server system, the power cap. Upon reaching the power cap as power ramps up, incrementing (410), by the controller in the server system, the power cap includes the controller 110 monitoring power usage and as power usage in a rack 140 or a group 150 increases up to the power cap, incrementing the power cap to a next level. For example, the power cap can be incremented a scaling of 10% or 50 W per minute to a next power cap. And as power usage continues to increase, the power cap can be incremented again, until the maximum power cap 212 is reached.

The method of FIG. 4 further differs from the method of FIG. 3, in that FIG. 4 includes upon reduction of power usage as power ramps down, decrementing (415), by the controller in the server system, the power cap. Upon reduction of power usage as power ramps down, decrementing (415), b by the controller in the server system, the power cap includes the controller 110 monitoring power usage and as power usage in a rack 140 or a group 150 decreases down to the lower power cap, decrementing the power cap to the previous or lower level.

For further explanation, FIG. 5 sets forth a flow chart illustrating an exemplary method for dynamic power scaling in a server system according to embodiments of the present disclosure. The method of FIG. 5 includes providing (305), by a controller in the server system, a maximum power cap; and setting (310), by the controller in the server system, a power ramp cap wherein the power ramp cap provides power scaling up and down, thereby efficiently managing power and workloads.

The method of FIG. 5 differs from the method of FIG. 3, in that FIG. 5 includes setting (505), by the controller in the server system, a power ramp cap for a group depending upon usage of all groups across the server system. Setting (505), by the controller in the server system, a power ramp cap for a group depending upon usage of all groups across the server system includes the administrator using the controller 110 to set a power ramp cap for a group of racks in the data center that depends upon the power usage of all the racks in all the groups in the data center. For example, when 25% of the racks in the data center are idle, then the administrator can adjust the power ramp cap for a specific group. Likewise, when 90% of the racks in the data center have heavy workloads, then the administrator can adjust the power ramp cap for a specific group.

In view of the explanations set forth above, readers will recognize that the benefits of dynamic power scaling in a server system according to embodiments of the present disclosure include:

Increase the power efficiency of a data center

Reduce the administrative overhead of the data center

Enable customers to make better use of the data center effectively

Exemplary embodiments of the present disclosure are described largely in the context of a fully functional computer system for dynamic power scaling in a server system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for dynamic power scaling in a server system, the method comprising:

receiving, by a controller in the server system, a maximum power cap that defines a maximum allowable power capacity for a component of the server system;

receiving, by the controller in the server system, a power ramp cap that defines a maximum rate of change of power usage over time for the component of the server system;

monitoring, by the controller, power usage data for the component of the server system; and adjusting, based on the power usage data, a first power cap set for the component of the server system in accordance with the power ramp cap and without exceeding the maximum power cap.

2. The method of claim 1, wherein adjusting the first power cap comprises determining from the power usage data that power usage of the component is increasing and incrementing the first power cap in accordance with the power ramp cap.

3. The method of claim 1, wherein adjusting the first power cap comprises determining from the power usage data that power usage of the component is decreasing and decrementing the first power cap in accordance with the power ramp cap.

4. The method of claim 1, wherein the maximum power cap is based upon a power capacity of the server system.

5. The method of claim 1, wherein the maximum power cap is based upon a cooling capacity of the server system.

6. The method of claim 1, wherein the component of the server system is associated with a customer of a data center, and wherein the power ramp cap is received by the customer.

7. The method of claim 1, wherein the component comprises a rack having multiple servers.

8. An apparatus for dynamic power scaling in a server system, the apparatus comprising a computer processor, a computer memory operatively coupled to the computer processor, the computer memory having disposed within it computer program instructions that are configured to, when executed by the computer processor, cause the apparatus to perform operations comprising:

receiving, by a controller in the server system, a maximum power cap that defines a maximum allowable power capacity for a component of the server system;

receiving, by the controller in the server system, a power ramp cap that defines a maximum rate of change of power usage over time for the component of the server system;

monitoring, by the controller, power usage data for the component of the server system; and adjusting, based on the power usage data, a first power cap set for the component of the server system in accordance with the power ramp cap and without exceeding the maximum power cap.

9. The apparatus of claim 8, wherein adjusting the first power cap comprises determining from the power usage data that power usage of the component is increasing and incrementing the first power cap in accordance with the power ramp cap.

10. The apparatus of claim 8, wherein adjusting the first power cap comprises determining from the power usage data that power usage of the component is decreasing and decrementing the first power cap in accordance with the power ramp cap.

11. The apparatus of claim 8, wherein the maximum power cap is based upon a power capacity of the server system.

12. The apparatus of claim 8, wherein the maximum power cap is based upon a cooling capacity of the server system.

13. The apparatus of claim 8, wherein the component comprises a rack having multiple servers.

14. A computer program product for dynamic power scaling in a server system, the computer program product disposed upon a computer readable medium, the computer program product comprising computer program instructions that are configured to, when executed, cause a computer to perform operations comprising:

receiving, by a controller in the server system, a maximum power cap that defines a maximum allowable power capacity for a component of the server system;

receiving, by the controller in the server system, a power ramp cap that defines a maximum rate of change of power usage over time for the component of the server system;

monitoring, by the controller, power usage data for the component of the server system; and adjusting, based on the power usage data, a first power cap set for the component of the server system in accordance with the power ramp cap and without exceeding the maximum power cap.

15. The computer program product of claim 14, wherein adjusting the first power cap comprises determining from the power usage data that power usage of the component is increasing and incrementing the first power cap in accordance with the power ramp cap.

16. The computer program product of claim 14, wherein adjusting the first power cap comprises determining from the power usage data that power usage of the component is decreasing and decrementing the first power cap in accordance with the power ramp cap.

17. The computer program product of claim 14, wherein the maximum power cap is based upon a power capacity of the server system.

18. The computer program product of claim 14, wherein the maximum power cap is based upon a cooling capacity of the server system.

19. The computer program product of claim 14, wherein the controller is a rack management controller that knows where each node is located with respect to one another.

20. The computer program product of claim 14, wherein the computer readable medium comprises a storage medium.

* * * * *